(12) United States Patent
Zhou

(10) Patent No.: US 8,794,592 B2
(45) Date of Patent: Aug. 5, 2014

(54) BIDIRECTIONAL PRESSURE SELF-BALANCING STOP VALVE

(76) Inventor: Jun Zhou, Nanjing (CN)

(*) Notice: Subject to any disclaimer, the term of this patent is extended or adjusted under 35 U.S.C. 154(b) by 169 days.

(21) Appl. No.: 13/515,279

(22) PCT Filed: Apr. 27, 2011

(86) PCT No.: PCT/CN2011/073379
§ 371 (c)(1),
(2), (4) Date: Jun. 11, 2012

(87) PCT Pub. No.: WO2011/134400
PCT Pub. Date: Nov. 3, 2011

(65) Prior Publication Data
US 2012/0305110 A1   Dec. 6, 2012

(30) Foreign Application Priority Data

Apr. 30, 2010   (CN) .......................... 2010 1 0160830

(51) Int. Cl.
*F16K 3/00* (2006.01)
*F16J 15/18* (2006.01)
*F16K 39/02* (2006.01)
*F16K 27/02* (2006.01)
*F16K 1/08* (2006.01)

(52) U.S. Cl.
CPC ................. *F16K 1/08* (2013.01); *F16J 15/184* (2013.01); *F16K 39/022* (2013.01); *F16K 27/02* (2013.01)
USPC ...................................................... 251/214

(58) Field of Classification Search
CPC ..... F16K 41/02; F16K 41/043; F16K 41/046; F16K 41/066
USPC ...................................................... 251/214
See application file for complete search history.

(56) References Cited

U.S. PATENT DOCUMENTS

| 1,502,734 | A | * | 7/1924 | Martin | 251/214 |
| 2,097,943 | A | * | 11/1937 | Zagorski | 251/214 |
| 3,443,789 | A | * | 5/1969 | Bucklin et al. | 251/214 |

(Continued)

FOREIGN PATENT DOCUMENTS

CN          2637835 Y     9/2004

OTHER PUBLICATIONS

"A new structure of globe valve"; Chemical Fertilizer Industry, 1989(2), p. 39. (with English abstract).

Primary Examiner — John K Fristoe, Jr.
Assistant Examiner — R. K. Arundale
(74) Attorney, Agent, or Firm — Rankin, Hill & Clark LLP

(57) ABSTRACT

The present invention discloses a bidirectional pressure self-balancing stop valve, comprising a valve body, a valve disc, a press ring, a valve bonnet, a valve rod and a balance hole, in which the valve disc is located inside the valve body chamber, the press ring is threadedly disposed on the upper side of the valve body chamber, the valve bonnet is fixedly connected with the valve body, the valve rod passes through the valve bonnet and the lower end of the valve rod is movably connected with the valve disc. The excircle of the valve disc, the press ring and the valve body form an annular groove, inside which is disposed with a composite seal ring that is high temperature resistant or corrosion resistant. The composite seal ring includes an upper washer, an upper seal ring, an upper distance ring, a blocking ring, a lower distance ring, a lower seal ring and a lower washer from top to bottom. The invention uses a bidirectional self-sealing structure. As the high temperature resistant composite seal ring is made of high temperature resistant sealing material with low density, the similar pressure self-sealing property of O or Y-shaped seal rings can also be obtained and then the sealing quality and sealing lifespan will be durable and reliable. In addition, the corrosion resistant composite seal ring made of corrosion resistant sealing material can be used in many corrosive environments.

10 Claims, 4 Drawing Sheets

(56) References Cited

U.S. PATENT DOCUMENTS

| | | | |
|---|---|---|---|
| 4,101,113 A * | 7/1978 | Plessing | 251/214 |
| 4,214,730 A * | 7/1980 | Baumann | 251/171 |
| 4,384,705 A * | 5/1983 | Kato | 251/214 |
| 6,935,616 B2 * | 8/2005 | Baumann | 251/282 |

* cited by examiner

BIDIRECTIONAL PRESSURE SELF-BALANCING STOP VALVE

FIELD OF THE INVENTION

The present invention relates to a valve, more particularly to a bidirectional pressure self-balancing stop valve, which is used to open or close bidirectional flow pipes under high temperature, high pressure or corrosive environments.

BACKGROUND OF THE INVENTION

Valves are essential parts of the pressure pipes used in petrochemical plants, oil fields, metallurgical plants and thermo-electric plants. In actual applications of the valves in the prior art, the medium pressure must be overcome to allow the opening/closing part to open and close the valves. When the valves are used in high temperature and high pressure pipes with large diameters, the medium pressure may bring large operating force to the valves and the sealing surfaces of the valves are easy to be damaged to cause leakage.

Pressure self-balancing valves follow the pressure self-balancing principle. The medium pressure on the opening/closing part can be self-balanced, therefore influence on operating performance, sealing quality and sealing lifespan of the valves is eliminated. The pressure self-balancing valves have become the target for the valve products in the prior art to be upgraded. The key technology is the sealing of the pressure self-balancing structure. The pressure self-balancing structure in the prior art generally adopts O or Y-shaped seal rings to provide sealing. Since self-sealing is achieved based on the medium pressure against the seal rings, the sealing degree is irrelevant with either the medium pressure or the sealing pre-tightening force. The sealing degree will not change when the sealing pre-tightening force drops after the seal rings wear; therefore durable and reliable sealing quality and sealing lifespan are achieved. Because the O or Y-shaped seal rings must be made of elastic materials with high density, the elastic materials are rubber or plastic that cannot stand high temperature. Due to the restriction of those elastic materials, the applicable temperature of the pressure self-balancing stop valves is still restricted below 200° C. and the stop valves cannot be used in high temperature and high pressure pipes that are large in applications and quantity.

Studies show that some low density sealing materials are high temperature resistant or corrosion resistant. For example, flexible graphite is a type of loose and high temperature resistant material with low density, and under high temperature, high pressure and radiation conditions, it is unlike to dissociate, deform or age. As it has stable chemical property, it is often used as the sealing packing for high temperature rods. As flexible graphite is not high density material, it cannot be used in O or Y-shaped seal rings. In the patent CN 2637835Y, applied in 2003, the inventor used high temperature resistant flexible graphite as the sealing material for the self-balancing stop valves. It solves the problem that the sealing material cannot stand high temperature. In that patent, the seal rings are made of high temperature resistant flexible graphite and press rings are applied to press the seal rings to solve the low density problem exist in high temperature resistant sealing materials, thus the excircle of the valve disc and the valve body can be sealed properly. However, the sealing structure in such structure does not have pressure self-sealing property; the sealing degree largely depended on the sealing pre-tightening force once the press rings tightly press the seal rings. In actual applications, the sealing degree will drop when the seal rings are worn by the valve disc. Consequently the sealing lifespan in that patent fails to meet the actual requirements.

In order to improve the applicability of the flexible graphite, Mr. Liu Wang disclosed a new structure stop valve with the following technical characteristics (see Journal of the Chemical Fertilizer Industry: lines 11-24 on the right column of page 39, vol. 2, 1989, schematic diagram of new structure of stop valve): a packing cover, packing and washers are disposed from top to bottom inside the valve. A handle is tightened to allow the packing cover and the washer to squeeze the packing together. The contact surface between the packing cover and the packing is a spherical surface to improve the sealing degree. The spherical surface can also compensate the wear at the upper side of the packing at any time. In that article, the packing cover is used to impose the pressing force on the packing to achieve the sealing on the valve head rod by the packing. The spherical surface of the contact surface between the packing cover and the packing is used to enhance the pressing force on the valve head rod by the packing so as to further strengthen the sealing on the valve head rod by the packing incircle. However, in actual applications, the sealing on the valve head depends on both the sealing on the valve head rod by the packing incircle and the sealing between the packing excircle and the packing box. But after the packing incircle is worn by the valve head rod, the sealing pre-tightening force of the packing incircle/excircle will drop accordingly. When the sealing pre-tightening force is lower than the medium pressure, the leakage will occur between the packing excircle and the packing box, where the pre-tightening force is relatively low. The leakage will occur between the excircle of the packing cover and the packing box. In the article, it mentioned that the packing needs not to be pressed for one or two months. Therefore it can be understood that the sealing lifespan of the stop valve is low and the packing must be pressed many times or in time to maintain the sealing on the valve head. The technical solution disclosed in that article is not applicable to the sealing environment of the pressure self-balancing valve.

SUMMARY OF THE INVENTION

In view of the above-described problems, it is one objective of the invention to overcome the disadvantages of the prior art by providing a bidirectional pressure self-balancing stop valve, which has a long lifespan and can be used under high temperature, high pressure or corrosive environments.

To achieve the above objective, in accordance with the invention, there provided is a bidirectional pressure self-balancing stop valve, comprising a valve body, a valve disc, a press ring, a valve bonnet, a valve rod and a balance hole, in which the valve disc is located inside the valve body chamber, the press ring is threadedly disposed on the upper side of the valve body chamber, the valve bonnet is fixedly connected with the valve body, the valve rod passes through the valve bonnet and the lower end of the valve rod is movably connected with the valve disc. The excircle of the valve disc, the press ring and the valve body form an annular groove, inside which is disposed with a composite seal ring that is high temperature resistant or corrosion resistant. The composite seal ring includes an upper washer, an upper seal ring, an upper distance ring, a blocking ring, a lower distance ring, a lower seal ring and a lower washer from top to bottom. The upper seal ring and the lower seal ring are made of high temperature resistant or corrosion resistant sealing materials. The upper washer, the upper distance ring, the lower distance ring and the lower washer are made of high temperature resistant or corrosion resistant rigid materials and form a clearance fit with the excircle of the valve disc. A lower end surface of the upper washer and an upper end surface of the upper distance ring are in the shapes of a conical surface, an inclined plane or a spherical surface, formed by squeezing the upper seal ring towards the internal direction of the valve disc. A lower end surface of the upper distance ring and an upper end surface of the lower distance ring are in the shapes of a cylindrical surface, a conical surface, an inclined plane or a spherical surface, formed by squeezing the blocking ring towards the external direction of the valve body. A lower end surface of the lower distance ring and an upper end surface of the lower washer are in the shapes of a conical surface, an inclined plane or a spherical surface, formed by squeezing the lower seal ring towards the internal direction of the valve disc.

By tightening the press ring to enable both the upper washer and the upper distance ring to squeeze the upper seal ring inwards, a larger sealing pre-tightening force is obtained on the incircle surface than that obtained on the excircle surface of the upper seal ring. Similarly, by tightening the press ring to enable both the lower distance ring and the lower washer to squeeze the lower seal ring inwards, a larger sealing pre-tightening force is obtained on the incircle surface than that obtained on the excircle surface of the lower seal ring. The blocking ring is disposed between the upper distance ring and the lower distance ring to block the passage on the excircle surfaces of both the upper seal ring and the lower seal ring.

The preferred high temperature resistant sealing material is flexible graphite and the preferred corrosion resistant sealing material is polytetrafluoroethylene. Along with the progress of the technology, more and more sealing materials have been discovered or synthesized. Any sealing material that is high temperature resistant or corrosion resistant or has other functions can be used in this invention so as to achieve the self-sealing. The rigid material used in this invention is metal or ceramic material or any other rigid materials that can be used to achieve the objective of the invention.

The upper washer and the press ring can be made either into two independent parts or as a whole, and preferably they are made into two independent parts.

The balance hole can be disposed on either the valve disc or the valve rod.

The blocking ring is an essential part in the invention. It is used to block the medium from moving upwards or downwards along the excircle surface of the upper or lower seal ring. When the blocking ring is made of flexible graphite and its section is in the shape of an isosceles trapezoid, the included angle between its side and excircle of the valve disc can be set to easily apply the squeezing force to the outer direction of the valve body through the lower end surface of the upper distance ring and the upper end surface of the lower distance ring so as to block the medium between the upper and lower seal rings. When O-shaped hollow seal ring made of metal material is used as the blocking ring, the squeezing force can be applied to the outer direction of the valve body through the lower end surface of the upper distance ring and the upper end surface of the lower distance ring so as to block the medium between the upper and lower seal rings. It is also possible that the real ring is disposed between the valve body and a cylinder of the upper or lower distance ring to block the medium between the upper and lower seal rings. But the manufacturing and mounting costs are high for the metal O-shaped hollow seal ring.

The present invention provides two types of preferred blocking methods with respect to the blocking ring: one is that the blocking ring is used as a seal ring that is made of the flexible graphite and whose section is an isosceles trapezoid, and the side thereof forms a 45° included angle with the excircle of the valve disc; the other one is that the blocking ring is used as an O-shaped hollow seal ring that is made of metal material.

Compare the invention with the prior art, the advantages of the present invention are summarized below: 1. the pressure self-sealing structure of the stop valve provided by the invention allows the high temperature resistant or corrosion resistant sealing material (e.g. flexible graphite) with low density to achieve the similar pressure self-sealing property as O or Y-shaped seal rings, so that durable and reliable sealing quality and sealing lifespan are achieved. The technical problem that pressure self-balancing stop valves cannot be used with high temperature medium has been completely solved. Consequently, the stop valve provided by the invention can be used to open or close high temperature and high pressure pipes with bidirectional flow of medium (>650° C.). Meanwhile, the corrosion resistant sealing material used in the invention, e.g. polytetrafluoroethylene, can also achieve the pressure self-sealing property and used with different corrosive medium; 2. The valve disc of the stop valve provided by the invention can achieve self-balance with respect to the medium pressure. The valve can be easily operated; therefore the labor intensity is reduced and the energy consumption of the auxiliary devices of the electric or pneumatic valves is also significantly reduced. The stop valves have broader applications on high temperature and high pressure bidirectional flow pipes with large diameter; 3. The stop valve is made of different materials and it can be used in different diameters of pipes having high temperature, high pressure and corrosive medium in one-way or two-way flow; and 4. The invention expands the applications of the pressure self-balancing valves working under high temperature and the safety problem of the valve has been solved in actual applications. For example, a high pressure valve has to be disposed before a high pressure water pump that is used to supply water to boilers, mines or oil wells. When the water pump starts to supply water, the valve must be open to make the smooth water supply, and when the water pump stops supplying water, the valve must be closed to prevent backflow of the high pressure water. Take the thermo-electric plant as another example, when it starts to generate power, the high temperature and high pressure steam produced by the boilers must be sent to a shared mother pipe via the high pressure valve. When the air supply is stopped to some boilers, the valve must also be closed to prevent the backflow of the high temperature and high pressure steam. In actual applications, the pipelines used in petrochemical plants, oil fields, metallurgical plants and power plants are generally composed of high temperature and high pressure bidirectional flow pipes. Many tests (e.g. sealing performance, reliability and actual applications) on the stop valve show that the stop valve provided by the invention has obvious technical advantages than those disclosed in the prior art and it has broad applications.

DETAILED DESCRIPTION OF THE EMBODIMENTS

The present invention is explained in further detail below with reference to the attached drawings, but it should be noted that the example provided by the invention shall not be used to restrict the protective scope of the invention.

Figure 1:
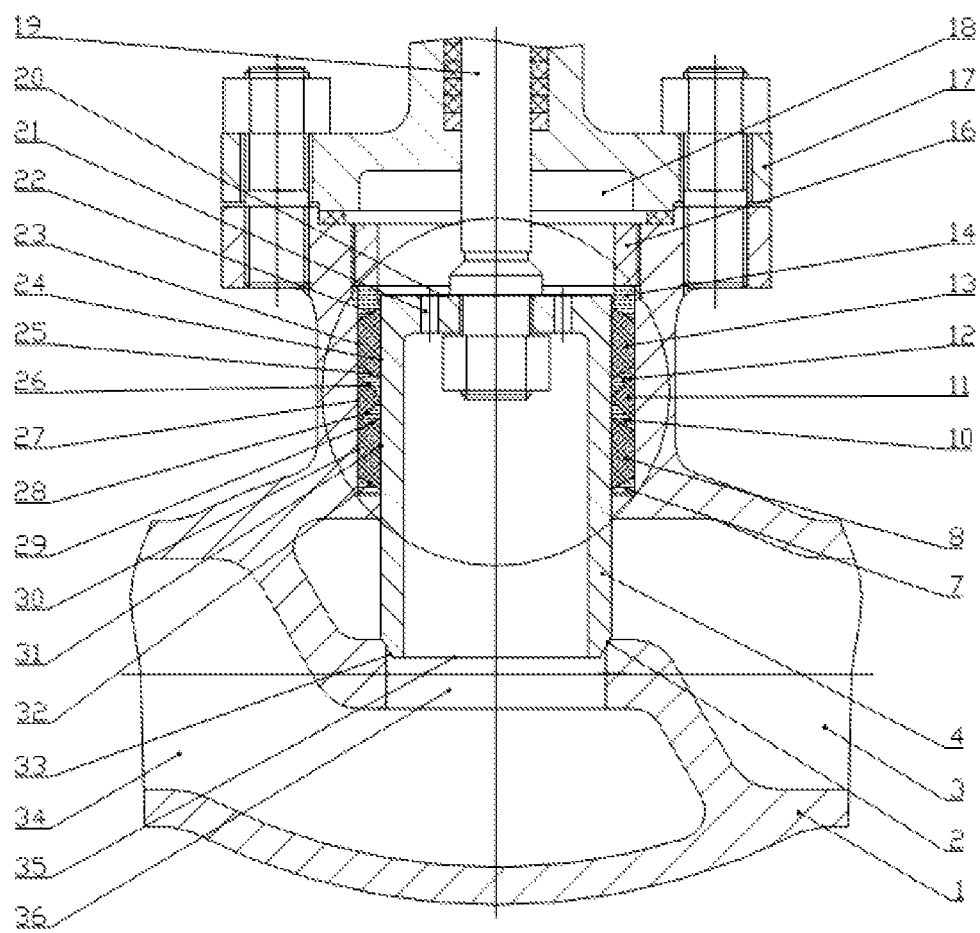
FIG. 1 is a structural representation of a bidirectional pressure self-balancing stop valve of the invention.
Figure 2:
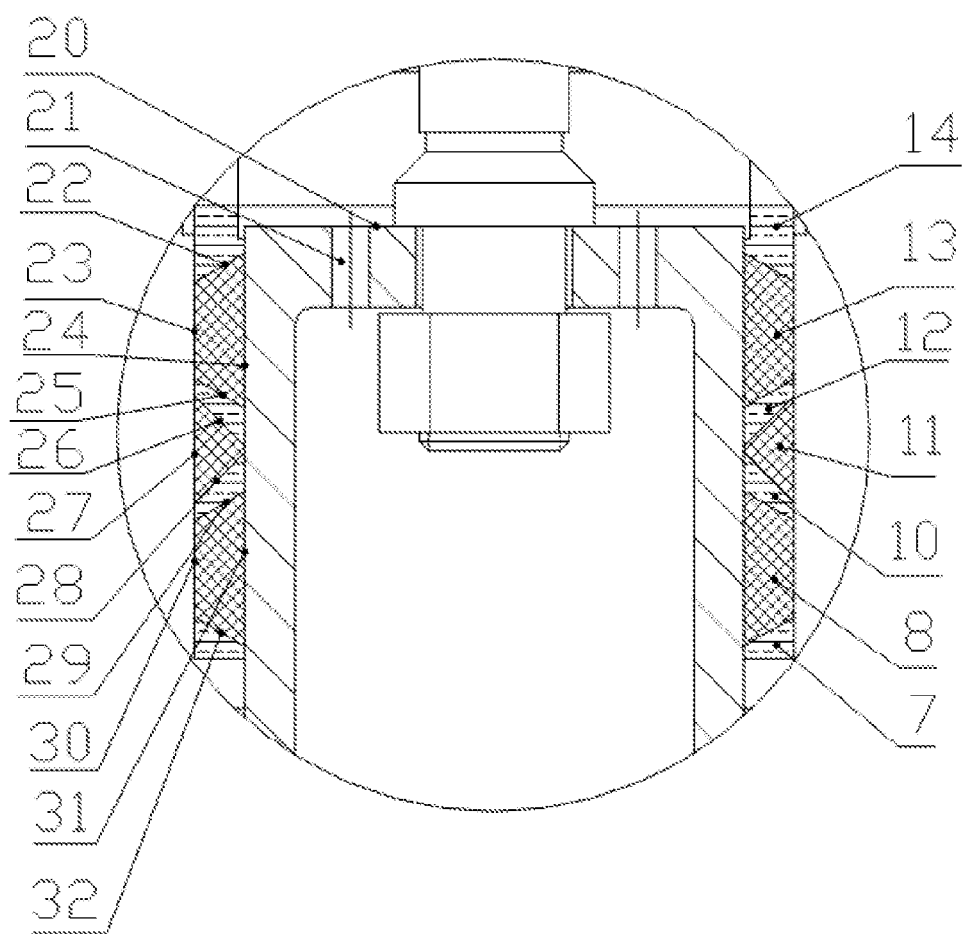
FIG. 2 is a partially enlarged view of FIG. 1.

As shown in FIGS. 1 and 2, a bidirectional pressure self-balancing stop valve, in accordance with the invention, comprises a valve body 1, a valve disc 4, a press ring 16, a valve bonnet 17, a valve rod 19 and a balance hole 21. Inside the valve body 1 is disposed with an upper passage 3, a lower passage 34 and an inner passage 36. The upper end surface of the inner passage 36 is disposed with a first sealing surface 2, which is sealed with the valve disc 4 and which is in the shape of a plane, a conical surface or a spherical surface. The valve disc 4 is located inside the chamber of the valve body 1. A lower end surface 35 of the valve disc 4 is disposed with a second sealing surface 33, which is sealed with the valve body 1 and which is also in the shape of a plane, a conical surface or a spherical surface. The press ring 16 is threadedly disposed on the upper side of the chamber of the valve body 1. The valve bonnet 17 is fixedly connected with the valve body 1. The valve rod 19 passes through the valve bonnet 17 and the lower end of the valve rod is movably connected with the valve disc 4. The valve rod 19 can carry the valve disc 4 to move up and down the chamber of the valve body 1 to achieve opening or closing of the bidirectional pressure self-balancing stop valve provided by the invention. The balance hole 21 is located either on the valve disc 4 or on the valve rod 19 to connect the lower passage 34 of the valve 1 under the lower end surface 35 of the valve disc 4 with a connecting chamber 18 between the valve body 1 and the valve bonnet 17 above an upper end surface 20 of the valve disc 4. The excircle of the valve disc 4, the press ring 16 and the valve body 1 form an annular groove, inside which is disposed with a composite seal ring that is high temperature resistant or corrosion resistant. The composite seal ring includes an upper washer 14, an upper seal ring 13, an upper distance ring 12, a blocking ring 11, a lower distance ring 10, a lower seal ring 8 and a lower washer 7 from top to bottom. The upper seal ring 13 and the lower seal ring 8 are made of high temperature resistant or corrosion resistant sealing materials. In addition, different sealing materials can be used according to actual needs, and in this example, flexible graphite is used in order to reach a high temperature. The blocking ring 11 is also made of flexible graphite, the section of the blocking ring is an isosceles trapezoid and the side thereof forms a 45° included angle with the excircle of the valve disc. The upper washer 14, the upper distance ring 12, the lower distance ring 10 and the lower washer 7 are made of metallic materials and form a clearance fit with the excircle of the valve disc 4. A lower end surface 22 of the upper washer 14 and an upper end surface 25 of the upper distance ring 12 are in the shapes of a conical surface, an inclined plane or a spherical surface, formed by squeezing the upper seal ring 13 towards the internal direction of the valve disc. A lower end surface 26 of the upper distance ring 12 and an upper end surface 28 of the lower distance ring 10 are in the shapes of a cylindrical surface, a conical surface, an inclined plane or a spherical surface, formed by squeezing the blocking ring 11 towards the external direction of the valve body. A lower end surface 29 of the lower distance ring 10 and an upper end surface 32 of the lower washer 7 are in the shapes of a conical surface, an inclined plane or a spherical surface, formed by squeezing the lower seal ring 8 towards the internal direction of the valve disc.

Figure 3:
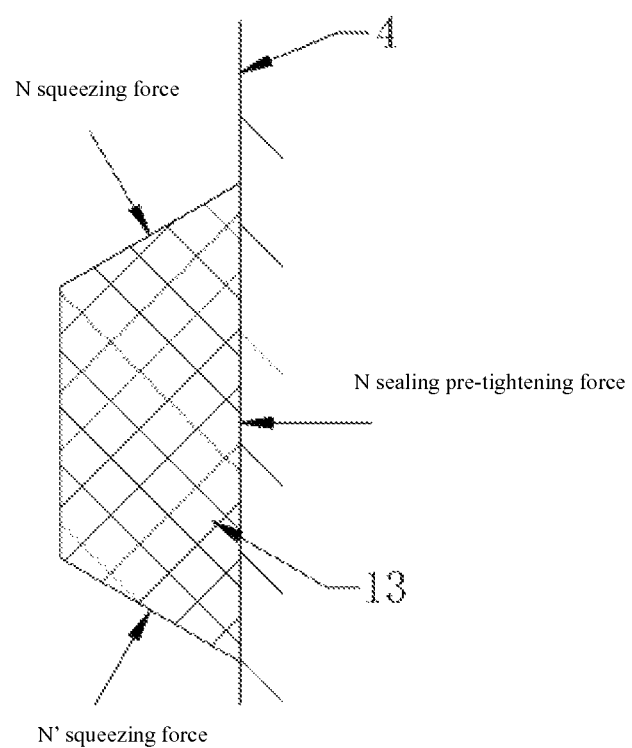
FIG. 3 is a schematic diagram of an upper seal ring being under squeezing force when it is pre-tightened.

By tightening the press ring 16 to enable both the upper washer 14 and the upper distance ring 12 to squeeze the upper seal ring 13 inwards, both the upper distance ring 12 and the lower distance ring 10 to squeeze the blocking ring 11 outwards, and both the lower distance ring 10 and the lower washer 7 to squeeze the lower seal ring 8 inwards, a larger sealing pre-tightening force is obtained on an incircle surface 24 than that obtained on an excircle surface 23 of the upper seal ring 13. FIG. 3 is a schematic diagram of the upper seal ring 13 being under squeezing force.

Similarly, a larger sealing pre-tightening force is obtained on an incircle surface 31 than that obtained on an excircle surface 30 of the lower seal ring 8 and a sufficient sealing pre-tightening force is obtained on an excircle surface 27 of the blocking ring 11. The blocking ring 11 is disposed between the upper distance ring 12 and the lower distance ring 10 to block the passage between the excircle surface 23 of the upper seal ring 13 and the excircle surface 30 of the lower seal ring 8.

The upper washer 14 and the press ring 16 can be made either into two independent parts or as a whole.

The working principle of the invention is as follows: when the bidirectional pressure self-balancing stop valve provided by the invention is connected with the pressure pipe and the stop valve is in a closed state, the lower end surface of the valve disc is closely against the upper end surface of the valve body passage to form a seal under the push of the valve rod. The self-balancing principle of the medium pressure: if the medium enters from the lower passage, the medium pressure applies to the lower end surface of the valve disc and meanwhile passes to the connecting chamber between the valve body and the valve bonnet via the balance hole disposed on the valve disc or the valve rod and then applies to the upper end surface of the valve disc to form a pair of opposite and offset axial force in the axial direction of the valve disc, so that the medium pressure on the valve disc is self-balanced. If the medium enters from the upper passage, the medium pressure applies to the excircle surface of the valve disc to form an offset radial force, so that the medium pressure on the valve disc is self-balanced. When the bidirectional pressure self-balancing stop valve is in an open state, the valve disc is lifted until the valve is completely open under the pull of the valve rod.

Figure 4:
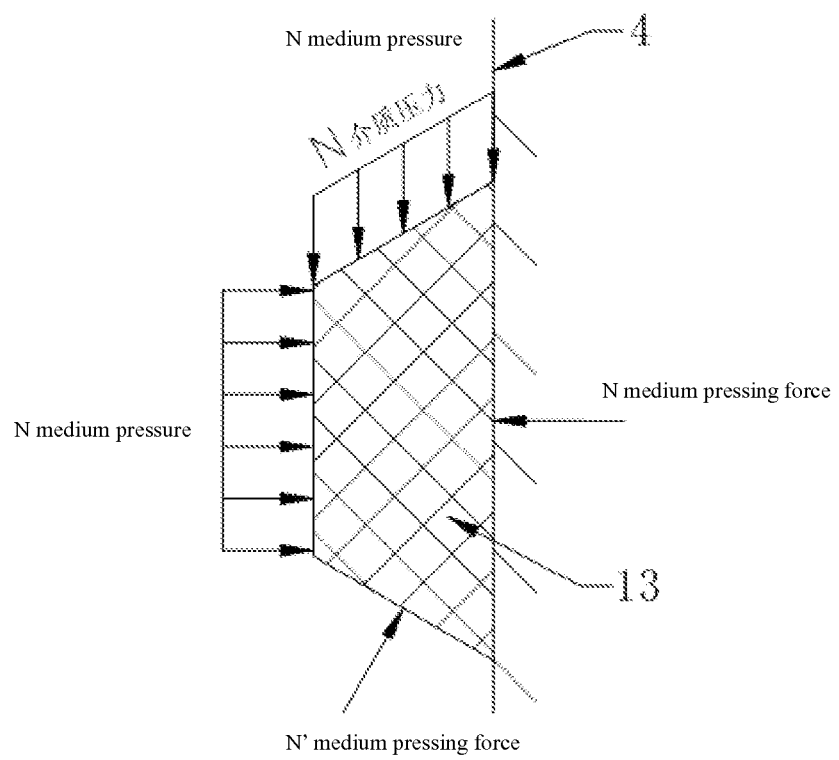
FIG. 4 is a pressure self-sealing diagram of a valve disc being under the pressure of the upper seal ring.

The self-sealing principle of the medium pressure on the seal ring of the invention is explained in further detail below with two circumstances:

1. When the pressure medium enters from the lower passage of the valve body, the self-sealing principle of the medium pressure is as follows (FIG. 4): the pressure medium is directed to the connecting chamber between the valve body and the valve bonnet via the balance hole disposed on the valve disc or the valve rod, and then the pressure medium infiltrates to the excircle surface of the upper seal ring having lower pre-tightening force via the aperture between the upper washer and the valve disc. As the blocking ring blocks the passage of the medium moving downwards along the excircle surface of the upper seal ring, the pressure medium infiltrated on the excircle surface of the upper seal ring starts to squeeze the excircle surface of the upper seal ring to force the incircle surface of the upper seal ring to be further against the excircle surface of the valve disc, so that the self-sealing is achieved when the upper seal ring applies pressure to the valve disc.

The sealing force on the excircle surface of the valve disc imposed by the incircle surface of the upper seal ring, in accordance with the invention, is achieved when the medium squeezes the excircle surface of the upper seal ring. The medium pressing force is then formed on the incircle surface of the upper seal ring and the excircle of the valve disc. Since the medium pressing force is a self-sealing force formed by the medium pressure and it is increasingly reliable when the medium pressure increases, the sealing degree is irrelevant to both the medium pressure and the sealing pre-tightening force of the excircle of the valve disc imposed by the incircle surface of the upper seal ring. The key problem regarding the self-sealing of the medium pressure by using the high temperature resistant material is solved. Although the excircle surface of the valve disc may cause friction against the incircle surface of the upper seal ring and the sealing pre-tightening force will be reduced, it cannot lower the sealing degree of the stop valve provided by the invention. The automatic wear compensation function carried by the stop valve of the invention can provide continuous sealing pre-tightening force. Consequently, sealing is not achieved by the pressing force between parts and sealing members, the durable and reliable sealing quality and sealing lifespan are achieved by simply tightening the press ring to obtain the sealing pre-tightening force that is largely lower than the medium pressure on both the incircle surface of the upper seal ring and the excircle surface of the valve disc.

2. When the pressure medium enters from the upper passage of the valve body, the self-sealing principle of the medium pressure is as follows: the medium infiltrates to the excircle surface of the lower seal ring having lower pre-tightening force via the aperture between the lower washer and the valve body. As the blocking ring blocks the passage of the medium moving upwards along the excircle surface of the lower seal ring, the pressure medium infiltrated to the excircle surface of the lower seal ring starts to squeeze the excircle surface of the lower seal ring to force the incircle surface of the lower seal ring to be further against the excircle surface of the valve disc, so that the self-sealing is achieved when the lower seal ring applies pressure to the valve disc.

The stability of the stop valve provided by the invention is explained in detail below with further experimental data.

1. The following is a performance comparison of the stop valve provided by the invention having the same parameters as that disclosed in the prior art.

| Comparison items | Valve required operating thrust | Valve required operating torque | Valve required power for electric drive | Applicable medium flow direction for disconnection | Sealing quality after disconnection |
|---|---|---|---|---|---|
| Prior Art | 260000N | 3500N · m | 7.5 KW | One-way | Small leakage |
| Invention | 20000N | 300N · m | 0.55 KW | One-way or two-way | No leakage |

Note: 1. Test valve: diameter DN100 mm; valve pressure PN32.0 MPa;

2. The above data is from Valve Design Manual, Mechanical Industry Press, Lu Peiwen 2002. 9.

2. Sealing and sealing lifespan tests

| Comparison items | Fluid sealing test | Lifespan test (number of opening and closing) |
|---|---|---|
| National standards | ≤12 drops/min | 3000 |
| Invention | 0 | 20000 |

Note: 1. Test valve: diameter DN100 mm; valve pressure PN32.0 MPa;

2. Inspection is passed on Oct. 21, 2008 by the National Pump Valves Quality Supervision and Testing Center.

It should be noted that the foregoing descriptions of the embodiments of the invention are intended to illustrate but not to limit this invention. Various changes and modifications may be made to the embodiments without departing from the spirit and scope of the invention.

The invention claimed is:

1. A bidirectional pressure self-balancing stop valve, comprising:
    a valve body, a valve disc, a press ring, a valve bonnet, a valve rod and a balance hole;
    the valve disc is located inside a chamber of the valve body, the press ring is disposed on the upper side of the chamber of the valve body,
    the valve bonnet is fixedly connected with the valve body,
    the valve rod passes through the valve bonnet and the lower end of the valve rod is movably connected with the valve disc,
    an excircle of the valve disc, the press ring and the valve body form an annular groove, inside which is disposed with a composite seal ring that is high temperature resistant or corrosion resistant,
    wherein the composite seal ring includes an upper washer, an upper seal ring, an upper distance ring, a blocking ring, a lower distance ring, a lower seal ring and a lower washer from top to bottom;
    the upper seal ring and the lower seal ring are made of high temperature resistant or corrosion resistant sealing materials;
    the upper washer, the upper distance ring, the lower distance ring and the lower washer are made of high temperature resistant rigid materials or corrosion resistant rigid materials.
    a lower end surface of the upper washer and an upper end surface of the upper distance ring are in the shapes of a conical surface, an inclined plane or a spherical surface, formed by squeezing the upper seal ring towards the internal direction of the valve disc, in order to enable both the upper washer and the upper distance ring to squeeze the upper seal ring inwards by tightening the press ring, and to obtain a larger sealing pre-tightening force on an incircle surface of the upper seal ring than that obtained on an excircle surface of the upper seal ring, wherein a pressure medium infiltrating into the excircle surface of the upper seal ring having the lower pre-tightening force via an aperture between the upper washer and the valve disc, to squeeze the excircle surface of the upper seal ring to force the incircle surface of the upper seal ring to be further against the excircle surface of the valve disc, such that the self-sealing occurs when the upper seal ring applies pressure to the valve disc;
    a lower end surface of the upper distance ring and an upper end surface of the lower distance ring are in the shapes of a cylindrical surface, a conical surface, an inclined plane or a spherical surface, formed by squeezing the blocking ring towards the external direction of the valve body, such that a passage between the excircle surface of the upper seal ring and an excircle surface of the lower seal ring is blocked; and a lower end surface of the lower distance ring and an upper end surface of the lower washer are in the shapes of a conical surface, an inclined plane or a spherical surface, formed by squeezing the lower seal ring towards the internal direction of the valve disc, such that a larger sealing pre-tightening force is obtained on an incircle surface of the lower seal ring than that obtained on the excircle surface of the upper seal ring, wherein the pressure medium infiltrates to the excircle surface of the lower seal ring having lower pre-tightening force via an aperture between the lower washer and the valve body, which forces the incircle surface of the lower seal ring to be further against the excircle surface of the valve disc, such that self-sealing occurs when the lower seal ring applies pressure to the valve disc.

2. The bidirectional pressure self-balancing stop valve of claim 1, wherein the press ring is threadedly disposed on the upper side of chamber of the valve body.

3. The bidirectional pressure self-balancing stop valve of claim 1, wherein the upper washer, the upper distance ring, the lower distance ring and the lower washer form a clearance fit with the excircle of the valve disc.

4. The bidirectional pressure self-balancing stop valve of claim 1, wherein the high temperature resistant sealing material is flexible graphite and the corrosion resistant sealing material is polytetrafluoroethylene.

5. The bidirectional pressure self-balancing stop valve of claim 1, wherein the rigid material is metal or ceramic material.

6. The bidirectional pressure self-balancing stop valve of claim 1, wherein the upper washer and the press ring can be made as a whole.

7. The bidirectional pressure self-balancing stop valve of claim 1, wherein the balance hole is disposed on the valve disc or the valve rod.

8. The bidirectional pressure self-balancing stop valve of claim 1, wherein the blocking ring is either a seal ring that is made of the sealing material and whose section is an isosceles trapezoid or an O-shaped hollow seal ring that is made of the metal material.

9. The bidirectional pressure self-balancing stop valve of claim 1, wherein on the valve body is disposed with a first sealing surface, which is sealed with the valve disc and which is in the shape of a plane, a conical surface or a spherical surface.

10. The bidirectional pressure self-balancing stop valve of claim 1, wherein on the valve disc is disposed with a second sealing surface, which is sealed with the valve body and which is in the shape of a plane, a conical surface or a spherical surface.

* * * * *